United States Patent
Deivasigamani (10) Patent No.: US 9,241,309 B2
(45) Date of Patent: Jan. 19, 2016

(54) DYNAMIC CONFIGURATION OF INACTIVITY TIMEOUTS FOR DATA RADIO BEARERS

(71) Applicant: Apple Inc., Cupertino, CA (US)

(72) Inventor: Giri Prassad Deivasigamani, San Jose, CA (US)

(73) Assignee: Apple Inc., Cupertino, CA (US)

( * ) Notice: Subject to any disclaimer, the term of this patent is extended or adjusted under 35 U.S.C. 154(b) by 135 days.

(21) Appl. No.: 14/070,827

(22) Filed: Nov. 4, 2013

(65) Prior Publication Data

US 2014/0126446 A1    May 8, 2014

Related U.S. Application Data

(60) Provisional application No. 61/722,934, filed on Nov. 6, 2012.

(51) Int. Cl.
*H04W 52/02* (2009.01)

(52) U.S. Cl.
CPC .................. *H04W 52/0216* (2013.01)

(58) Field of Classification Search
None
See application file for complete search history.

(56) References Cited

U.S. PATENT DOCUMENTS

| | | | | |
|---|---|---|---|---|
| 4,926,375 | A * | 5/1990 | Mercer et al. | 709/201 |
| 7,949,377 | B2 | 5/2011 | Islam et al. | |
| 8,631,497 | B1 * | 1/2014 | Oliphant et al. | 726/25 |
| 2001/0018342 | A1 * | 8/2001 | Vialen et al. | 455/423 |
| 2005/0063304 | A1 | 3/2005 | Sillasto et al. | |
| 2007/0274233 | A1 | 11/2007 | Ptashek et al. | |
| 2010/0046519 | A1 * | 2/2010 | Dan et al. | 370/394 |
| 2011/0096706 | A1 | 4/2011 | Ramasamy et al. | |
| 2011/0201303 | A1 | 8/2011 | Cutler et al. | |
| 2011/0201343 | A1 | 8/2011 | Pinheiro et al. | |
| 2012/0149386 | A1 | 6/2012 | Kumar et al. | |
| 2012/0179763 | A1 | 7/2012 | Ferland et al. | |
| 2013/0308545 | A1 | 11/2013 | Lee et al. | |

FOREIGN PATENT DOCUMENTS

WO    WO2012134099    10/2012

OTHER PUBLICATIONS

Taiwanese Patent Application No. 102139973—Office Action dated Dec. 30, 2014.

(Continued)

*Primary Examiner* — Chi H Pham
*Assistant Examiner* — Shick Hom
(74) *Attorney, Agent, or Firm* — Downey Brand LLP (57) ABSTRACT

Method and apparatus for dynamic configuration of an inactivity timeout period for a data radio bearer used to transport data for a data service between a wireless communication device and a wireless network is provided. The method includes formatting a message including information related to the data service. The method further includes sending the message from the wireless communication device to the wireless network that is attendant to establishment of the data radio bearer for the data service. The method additionally includes receiving, at the wireless communication device, an assignment of the data service to the data radio bearer. The data radio bearer can have a customized inactivity timeout period defined by the wireless network based at least in part on the information in the message provided by the wireless communication device. The method also includes sending data for the data service over the data radio bearer.

20 Claims, 6 Drawing Sheets

(56) References Cited

OTHER PUBLICATIONS

ETRI, "MTC device/low priority/roaming indications at RRC connection setup", R2-106188, 3GPP TSG RAN WG2 Meeting #72, Jacksonville, USA, Nov. 15-19, 2010, pp. 1-4.

PCT Application PCT/US2013/068255—International Search Report & Written Opinion dated Feb. 27, 2014.

* cited by examiner

DYNAMIC CONFIGURATION OF INACTIVITY TIMEOUTS FOR DATA RADIO BEARERS

CROSS-REFERENCE TO RELATED APPLICATIONS

This application claims the benefit of U.S. Provisional Application No. 61/722,934, filed Nov. 6, 2012 and entitled "DYNAMIC CONFIGURATION OF INACTIVITY TIMEOUTS FOR DATA RADIO BEARERS," which is incorporated by reference herein in its entirety for all purposes.

TECHNICAL FIELD

The described embodiments relate generally to wireless communications and more particularly to dynamic configuration of inactivity timeouts for data radio bearers used for communication between a wireless communication device and a wireless network.

BACKGROUND

A wireless communication device can transmit data over a data radio bearer established between the wireless communication device and a serving base station of a wireless network. In this regard, the data radio bearer can be established when the wireless communication device has data available to transmit, e.g., mobile originated data, or has data to receive from the wireless network, e.g., mobile terminated data. When the wireless communication device has an established active data radio bearer, the wireless communication device can operate in a radio resource control (RRC) connected mode, having an active RRC connection with the wireless network. A wireless communication device operating in the RRC connected mode can consume more power than when the device does not have an active RRC connection, resulting in an increased battery drain rate. Furthermore, when the wireless communication device operates in the RRC connected mode, an additional signaling load to support the RRC connection can be imposed on the wireless network.

Typically, a serving base station of a wireless network can release an established RRC connection to a wireless communication device in order to reallocate radio resources of the radio access network, to reduce network signaling load overhead that may result from the wireless communication device remaining in the RRC connected mode when not actively transmitting data, and/or to reduce unnecessary power drain by the wireless communication device in the RRC connected mode with no attendant data to send or receive. The wireless network can determine a length of time of data and/or signaling inactivity after which the RRC connection can be released. In general, the wireless network can use a particular value for the inactivity timeout period, regardless of the type of data service for which a data radio bearer is established. For example, a fixed 10 second inactivity timeout period is often used by wireless networks. This relatively long inactivity timeout period value can be appropriate for certain types of data sessions, e.g., Internet browsing, for which downlink and uplink data are interspersed with inactive time periods. However, for some data services, such as short message service (SMS) transmission, after completion of a relatively short data transmission, the data service can have no additional data to transmit over the data radio bearer associated with the established RRC connection. With a fixed value for the inactivity timeout period, the RRC connection can be maintained longer than required by the underlying data service. As such, applying a common fixed value for the inactivity timeout can result in the wireless communication device remaining in the RRC connected mode longer than needed in many instances, thus unnecessarily increasing battery consumption by the wireless communication device.

SUMMARY OF THE DESCRIBED EMBODIMENTS

Some embodiments disclosed herein provide for dynamic configuration of values used for inactivity timeout periods associated with data radio bearers and/or with a radio resource control (RRC) connection between a wireless communication device and a wireless network. A length of time for the inactivity timeout periods can be based on information provided by the wireless communication device to the wireless network. In this regard, some example embodiments provide for dynamic definition of a customized inactivity timeout time period by a wireless network based at least in part on information related to a data service for which a data radio bearer is established. The information related to the data service can, for example, be provided to the wireless network by the wireless communication device and can include information such as a data service type of the data service, an amount of data to be sent for the data service, user history information, an indication of a state of the wireless communication device, and/or other information that can be used by the wireless network to dynamically configure an inactivity timeout period for a data radio bearer used by the wireless communication device in communication with the wireless network. Dynamic configuration of the inactivity timeout period in accordance with such example embodiments can reduce an amount of time that the wireless communication device can remain in an RRC connected mode. Accordingly, such example embodiments can reduce an incidence of unnecessary power consumption by the wireless communication device and can also reduce signaling overhead in a radio access portion of the wireless network.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Some embodiments disclosed herein provide for dynamic configuration of inactivity timeouts for data radio bearers. More particularly, some example embodiments provide for dynamic configuration of an inactivity timeout period by a wireless network based at least in part on information related to a data service for which a data radio bearer is to be established. The information related to the data service can, for example, be provided to the wireless network that is attendant to establishment of the data radio bearer by the wireless communication device. The wireless network can determine a value for an inactivity timeout period associated with the data radio bearer using the information provided by the wireless communication device. The inactivity time period can be customized to match characteristics of a data service that can send and/or receive data using the data radio bearer. The data service for which the data radio bearer is established can be assigned to the data radio bearer in accordance with such example embodiments so that the data service has a customized inactivity timeout period particular to the assigned data radio bearer. If another data service is activated, that data service can be assigned to another data radio bearer that can have its own inactivity timeout period. As such, through dynamic configuration of inactivity timeout periods for particular data services and assignment of data services to dedicated data radio bearers, some example embodiments can reduce an amount of time that a device can unnecessarily remain in an RRC connected mode at the conclusion of a data transmission, e.g., by avoiding use of an unnecessarily long inactivity timeout period in a scenario in which it is unlikely that further data will be transmitted (or known that data transmission is finished) following a period of inactivity. Accordingly, such example embodiments can reduce power consumption by a wireless communication device and can reduce network signaling overhead by providing for a more rapid release of an RRC connection by the wireless network in some instances.

In a first embodiment, a method to establish a data radio bearer with a customized inactivity timeout period between a wireless communication device and a wireless network is provided. The method of the first embodiment includes formatting, by a processor of the wireless communication device, a message including information related to a data service; sending the message from the wireless communication device to the wireless network that is attendant to establishing one or more data radio bearers for the data service; and receiving, at the wireless communication device, an assignment of the data service to the data radio bearer. The data radio bearer is associated with the customized inactivity timeout period defined by the wireless network based at least in part on the information related to the data service provided by the wireless communication device. The method of the first embodiment also includes sending data for the data service from the wireless communication device to the wireless network via the data radio bearer. In some embodiments, the customized inactivity timeout period determines a continuous time period of inactivity for the data radio bearer after which the wireless network releases the data radio bearer. In some embodiments, the information related to the data service includes an indication of a data service type of the data service, and wherein the data radio bearer is dedicated exclusively for servicing the indicated data service type.

In a second embodiment, a wireless communication device comprising a transceiver and processing circuitry is provided. The transceiver can be configured to transmit data to and receive data from a wireless network. The processing circuitry can be coupled to the transceiver, and can be configured to control the wireless communication device of the second embodiment to at least format a message including information related to a data service; send the message to the wireless network that is attendant to establishment of a data radio bearer for the data service; and receive an assignment of the data service to the data radio bearer. The data radio bearer can have an inactivity timeout period defined by the wireless network based at least in part on the information related to the data service. The processing circuitry can be configured to further control the wireless communication device of the second embodiment to send data for the data service to the wireless network over the data radio bearer.

In a third embodiment, a computer program product is provided. The computer program product of the third embodiment can include at least one non-transitory computer readable storage medium having program code stored thereon. The program code can include program code for formatting a message including information related to a data service; program code for sending the message from a wireless communication device to a wireless network that is attendant to establishment of a data radio bearer for the data service; and program code for receiving, at the wireless communication device, an assignment of the data service to the data radio bearer. The data radio bearer can have an inactivity timeout period defined by the wireless network based at least in part on the information related to the data service provided in the message to the wireless network by the wireless communication device. The program code can also include program code for sending data for the data service from the wireless communication device to the wireless network over the data radio bearer.

In a fourth embodiment, an apparatus is provided that can include means for formatting a message including information related to a data service; means for sending the message from a wireless communication device to a wireless network that is attendant to establishment of a data radio bearer for the data service; and means for receiving, at the wireless communication device, an assignment of the data service to the data radio bearer. The data radio bearer can have an inactivity timeout period defined by the wireless network based at least in part on the information related to the data service provided in the message from the wireless communication device. The apparatus of the fourth embodiment can also include means for sending data for the data service from the wireless communication device to the wireless network over the data radio bearer.

In a fifth embodiment, a method is provided. The method of the fifth embodiment can include receiving, at a radio access network entity, a message originated by a wireless communication device and including information related to a data service. The message can be attendant to a request for data radio bearer establishment for the data service. The method of the fifth embodiment can further include defining an inactivity timeout period based at least in part on the information related to the data service; establishing a data radio bearer having the determined inactivity timeout period; and assigning the data service to the data radio bearer.

In a sixth embodiment, an apparatus including processing circuitry is provided. The processing circuitry can be configured to control the apparatus of the sixth embodiment to receive a message originated by a wireless communication device and including information related to a data service. The message can be attendant to a request for data radio bearer establishment for the data service. The processing circuitry can be further configured to control the apparatus of the sixth embodiment to define an inactivity timeout period based at least in part on the information related to the data service; establish a data radio bearer having the determined inactivity timeout period; and assign the data service to the data radio bearer.

In a seventh embodiment, a computer program product is provided. The computer program product of the seventh embodiment can include at least one non-transitory computer readable storage medium having program code stored thereon. The program code can include program code for receiving, at a radio access network entity, a message originated by a wireless communication device and including information related to a data service. The message can be attendant to a request for data radio bearer establishment for the data service. The program code can further include program code for defining an inactivity timeout period based at least in part on the information related to the data service; program code for establishing a data radio bearer having the determined inactivity timeout period; and program code for assigning the data service to the data radio bearer.

In an eighth embodiment, an apparatus is provided that can include means for receiving, at a radio access network entity, a message originated by a wireless communication device and including information related to a data service. The message can be attendant to a request for data radio bearer establishment for the data service. The apparatus of the eighth embodiment can further include means for defining an inactivity timeout period based at least in part on the information related to the data service; means for establishing a data radio bearer having the determined inactivity timeout period; and means for assigning the data service to the data radio bearer.

Figure 1:
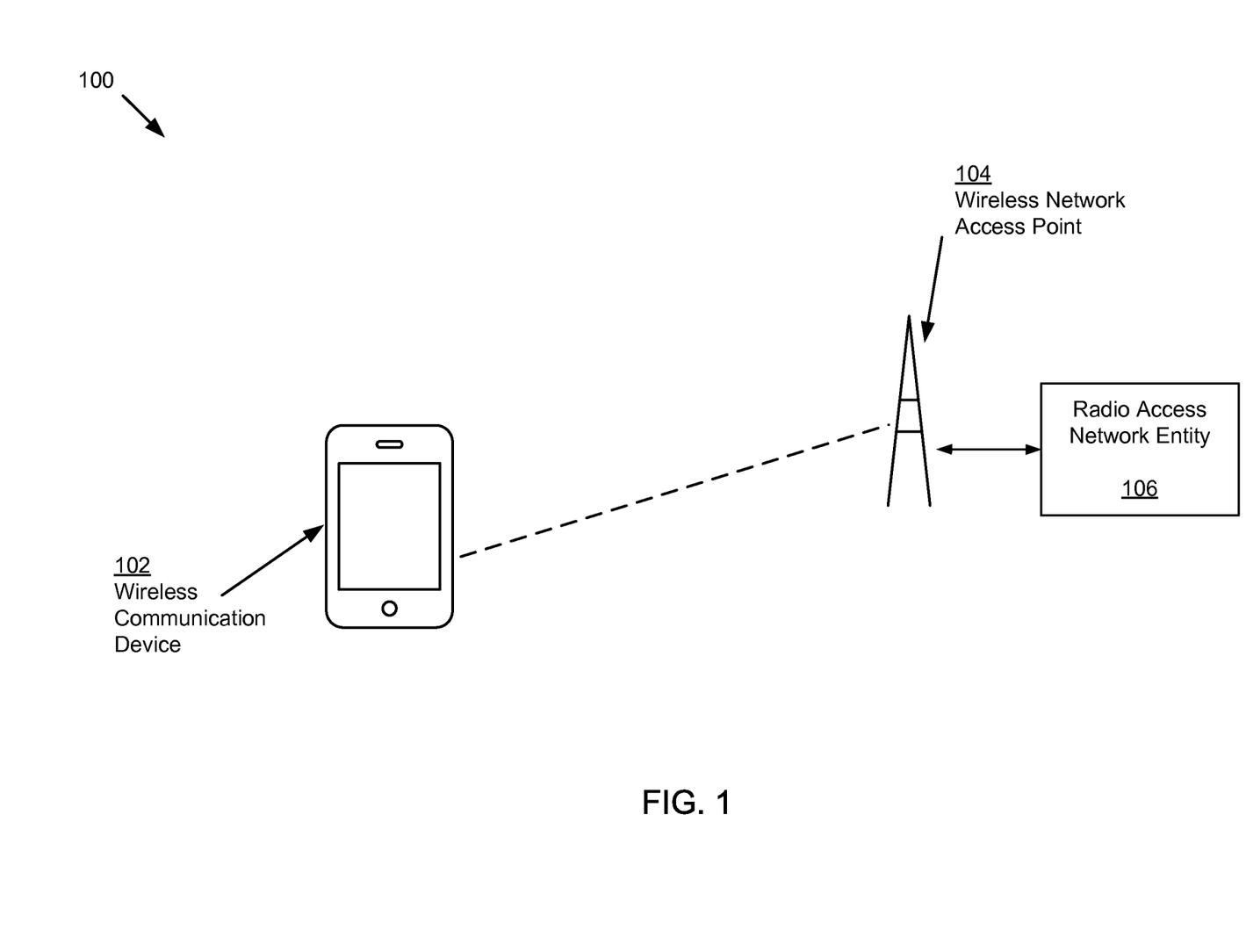
FIG. 1 illustrates a system for dynamic configuration of inactivity timeouts for data radio bearers in accordance with some example embodiments.

FIG. 1 illustrates a system 100 for dynamic configuration of inactivity timeouts for data radio bearers in accordance with some example embodiments. The system 100 can include a wireless communication device 102. The wireless communication device 102 can be a cellular phone, such as a smart phone device, a tablet computing device, a laptop computing device, or other computing device configured to operate within a wireless network, such as by way of non-limiting example a cellular wireless network.

The wireless communication device 102 can be configured to access a wireless network through a wireless network access point 104. The wireless network access point 104 can, for example, be a cellular base station, such as a base station (BS), a base transceiver station (BTS), a node B, an evolved node B (eNB), or another base station that can provide access via radio frequency communication to a cellular wireless network. In embodiments in which the wireless network access point 104 provides access to a cellular wireless network, the cellular wireless network can be operated in accordance with any present or future cellular wireless networking communication protocol, which can also be referred to as a wireless networking standard. By way of non-limiting example, the wireless network access point 104 can provide access to, and the wireless communication device 102 can be configured to access, a Long Term Evolution (LTE) network, an LTE-Advanced network, a Universal Mobile Telecommunications System (UMTS) network (e.g., a Wideband Code Division Multiple Access (WCDMA), a Time Division Synchronous Code Division Multiple Access (TD-SCDMA) network, and/or another UMTS network), a Code Division Multiple Access (CDMA) 2000 network, a 1×RTT network, and/or another cellular wireless network.

The wireless network, which can be accessed via the wireless network access point, can include a radio access network (RAN) portion, which can include a RAN entity 106. The RAN entity 106 can be embodied as any apparatus or plurality of apparatuses that can be implemented on a RAN. By way of non-limiting example, the RAN entity 106 can include a base transceiver station, base station controller, an eNB, a radio network controller, and/or other entity that can form a portion of a RAN. In this regard, in some example embodiments, the RAN entity 106 can include, or be implemented on the wireless network access point 104. As will be described further herein below, the RAN entity 106 can be any apparatus that can be configured to perform RRC connection and data radio bearer establishment and release procedures for a network in accordance with one or more example embodiments.

Figure 2:
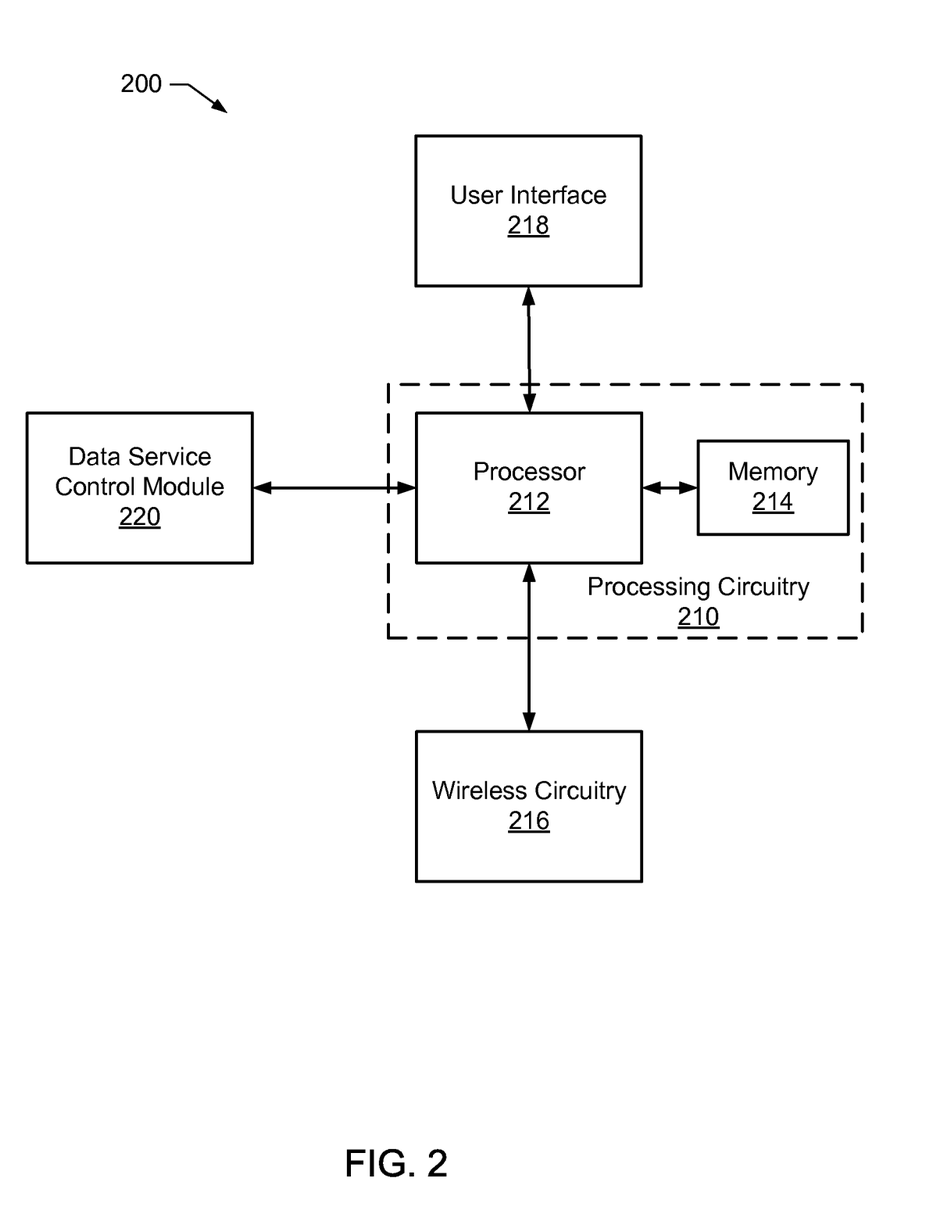
FIG. 2 illustrates a block diagram of an apparatus that can be implemented on a wireless communication device in accordance with some example embodiments.

FIG. 2 illustrates a block diagram of an apparatus 200 that can be implemented on a wireless communication device 102 in accordance with some example embodiments. In this regard, when implemented on a computing device, such as the wireless communication device 102, apparatus 200 can enable the computing device to operate within the system 100 in accordance with one or more example embodiments. It will be appreciated that the components, devices or elements illustrated in and described with respect to FIG. 2 may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 in accordance with various example embodiments, and thus can provide means for performing functionalities of the apparatus 200 in accordance with various example embodiments. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a chipset including one or more chips. In some example embodiments in which one or more components of the apparatus 200 are embodied as a chipset, the chipset can be capable of enabling a computing device to operate in the system 100 when implemented on or otherwise operably coupled to the computing device. Thus, for example, one or more components of the apparatus 200 can provide a chipset configured to enable a computing device to operate on a cellular wireless network.

In some example embodiments, the processing circuitry 210 can include a processor 212 and, in some embodiments, such as that illustrated in FIG. 2, can further include memory 214. The processing circuitry 210 can be in communication with or otherwise control the wireless circuitry 216, user interface 218, and/or the data service control module 220.

The processor 212 can be embodied in a variety of forms. For example, the processor 212 can be embodied as various processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the apparatus 200 as described herein. In some example embodiments, the processor 212 can be configured to execute instructions that can be stored in the memory 214 or that can be otherwise accessible to the processor 212. As such, whether configured by hardware or by a combination of hardware and software, the processor 212 can be capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, wireless circuitry 216, user interface 218, or data service control module 220 via a bus(es) for passing information among components of the apparatus 200.

The apparatus 200 can further include wireless circuitry 216. The wireless circuitry 216 can enable the apparatus 200 to send wireless radio frequency signals to and receive wireless radio frequency signals from a wireless network. In this regard, the wireless circuitry 216 can be configured to enable the wireless communication device 102, which can include the apparatus 200, to send signals to and receive signals from the wireless network access point 104. As such, the wireless circuitry 216 can be configured to support any type of cellular or other wireless communication technology that may be implemented by the wireless network access point 104. The wireless circuitry 216 in the apparatus 200 can include one or more wireless circuitry modules including processors and specific wireless components to transmit and receive wireless signals according to various wireless communication protocols. A wireless circuitry module (which can also be referred to as a wireless subsystem, a transceiver, a signal chain, or a radio in some embodiments) of the apparatus 200 can include transmitters and receivers to provide signal processing of radio frequency wireless signals formatted according to wireless communication protocols, e.g., according to an LTE wireless communication protocol, a CDMA 2000 1x wireless communication protocol, or another cellular wireless communication protocol. In some embodiments, the wireless circuitry module can include components such as: processors and/or specific-purpose digital signal processing (DSP) circuitry for implementing functionality such as, but not limited to, baseband signal processing, physical layer processing, data link layer processing, and/or other functionality; one or more digital to analog converters (DACs) for converting digital data to analog signals; one or more analog to digital converters (ADCs) for converting analog signals to digital data; radio frequency (RF) circuitry (e.g., one or more amplifiers, mixers, filters, phase lock loops (PLLs), and/or oscillators); and/or other components.

A user interface 218 (if implemented on the apparatus 200) may be in communication with the processing circuitry 210 to receive an indication of a user input at the user interface 218 and/or to provide an audible, visual, mechanical or other output to the user. As such, the user interface 218 may include, for example, a keyboard, a mouse, a joystick, a display, a touch screen, a microphone, a speaker, and/or other input/output mechanisms.

The apparatus 200 can further include data service control module 220. The data service control module 220 can be embodied as various means, such as circuitry, hardware, a computer program product comprising computer readable program instructions stored on a non-transitory computer readable medium (for example, the memory 214) and executed by a processing device (for example, the processor 212), or some combination thereof. In some embodiments, the processor 212 (or the processing circuitry 210) can include, or otherwise control the data service control module 220.

Figure 3:
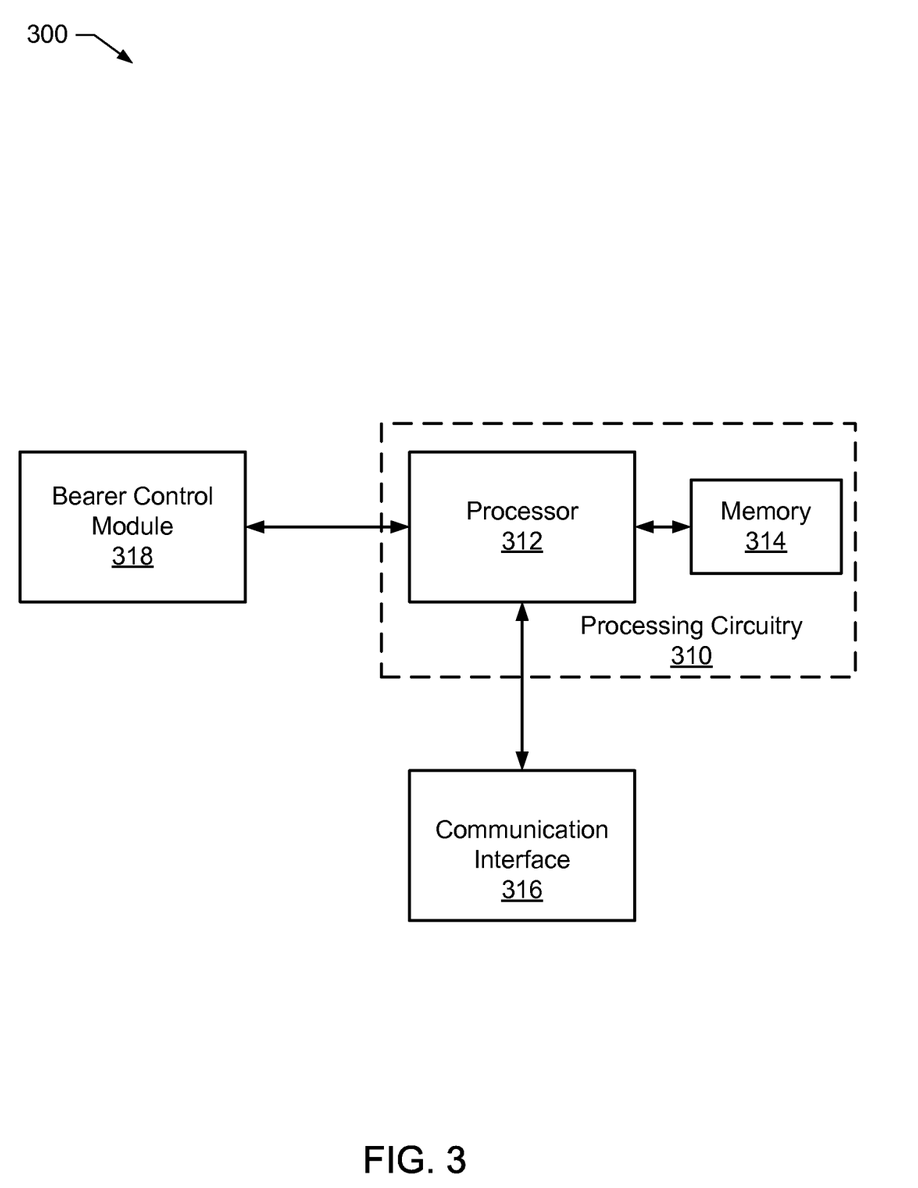
FIG. 3 illustrates a block diagram of an apparatus that can be implemented on a radio access network entity in accordance with some example embodiments.

FIG. 3 illustrates a block diagram of an apparatus 300 that can be implemented on the RAN entity 106 in accordance with some example embodiments. It will be appreciated that the components, devices or elements illustrated in and described with respect to FIG. 3 may not be mandatory and thus some may be omitted in certain embodiments. Additionally, some embodiments can include further or different components, devices or elements beyond those illustrated in and described with respect to FIG. 3.

In some example embodiments, the RAN entity 106 can include processing circuitry 310 that is configurable to perform actions in accordance with one or more example embodiments disclosed herein. In this regard, the processing circuitry 310 can be configured to perform and/or control performance of one or more functionalities of the RAN entity 106 in accordance with various example embodiments, and thus can provide means for performing functionalities of the RAN entity 106 in accordance with various example embodiments. The processing circuitry 310 can be configured to perform data processing, application execution and/or other processing and management services according to one or more example embodiments.

In some embodiments, the RAN entity 106 or a portion(s) or component(s) thereof, such as the processing circuitry 310, can include one or more chipsets, which can each include one or more chips. The processing circuitry 310 and/or one or more further components of the RAN entity 106 can therefore, in some embodiments, be configured to implement an embodiment on a chipset.

In some example embodiments, the processing circuitry 310 can include a processor 312 and, in some embodiments, such as that illustrated in FIG. 3, can further include memory 314. The processing circuitry 310 can be in communication with or otherwise control a communication interface 316 and/or bearer control module 318.

The processor 312 can be embodied in a variety of forms. For example, the processor 312 can be embodied as various processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of the RAN entity 106 as described herein. In embodiments including a plurality of processors, the processors can be implemented on a single computing device, or can be distributed across a plurality of computing devices that can be collectively configured to provide functionality of the RAN entity 106 in accordance with some example embodiments. In some example embodiments, the processor 312 can be configured to execute instructions that can be stored in the memory 314 or that can be otherwise accessible to the processor 312. As such, whether configured by hardware or by a combination of hardware and software, the processor 312 capable of performing operations according to various embodiments while configured accordingly.

In some example embodiments, the memory 314 can include one or more memory devices. In embodiments including multiple memory devices, the memory devices can be implemented on a single computing device, or can be distributed across a plurality of computing devices that can be collectively configured to provide functionality of the RAN entity 106 in accordance with some example embodiments. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the RAN entity 106 to carry out various functions in accordance with one or more example embodiments. In some embodiments, the memory 314 can be in communication with one or more of the processor 312, communication interface 316, or bearer control module 318 via a bus, or via multiple busses, for passing information among components of the RAN entity 106.

The RAN entity 106 can further include a communication interface 316. The communication interface 316 can enable the RAN entity 106 to communicate with the wireless communication device 102 for purposes of establishing and releasing a data radio bearer. In this regard, the communication interface 316 can include one or more interface mechanisms for enabling communication with other devices and/or networks. As such, the communication interface 316 can include, for example, an antenna (or multiple antennas) and supporting hardware and/or software for enabling communications in accordance with a wireless network standard (e.g., a cellular wireless network standard, a wireless local area network standard, and/or the like) and/or a communication modem or other hardware/software for supporting communication via cable, digital subscriber line (DSL), USB, FireWire, Ethernet or other wireline networking methods. For example, in embodiments in which the RAN entity 106 is implemented on the wireless network access point 104, the communication interface 316 can include a transceiver configured to support wireless communications with the wireless communication device 102. As another example, in embodiments in which the RAN entity 106 is at least partially implemented as an entity separate from the wireless network access point 104, the communication interface 316 can be configured to support communication with the wireless network access point 104, such as via a wireline connection with the wireless network access point 104, a wireless connection with the wireless network access point 104, a network that can interface the wireless network access point 104 and RAN entity 106, and/or other connection that can enable connection between the wireless network access point 104 and RAN entity 106.

The RAN entity 106 can further include bearer control module 318. The bearer control module 318 can be embodied as various means, such as circuitry, hardware, a computer program product comprising computer readable program instructions stored on a computer readable medium (for example, the memory 314) and executed by a processing device (for example, the processor 312), or some combination thereof. In some embodiments, the processor 312 (or the processing circuitry 310) can include, or otherwise control the bearer control module 318.

In accordance with some example embodiments, the data service control module 220 can be configured to request establishment of a data radio bearer in an instance in which a data service, which can be implemented on the wireless communication device 102, needs to send or to receive data. In some instances, the request can be made when the wireless communication device 102 is operating in an "idle" mode (e.g., an RRC idle mode) such that the wireless communication device 102 can transition from the idle mode to a "connected" mode (e.g., an RRC connected mode) attendant to establishment of the data radio bearer. Alternatively, the request can be made in an instance in which the wireless communication device 102 is already operating in a connected mode, such as in an instance in which the wireless communication device 102 may have an existing active data radio bearer for another data service and can seek to establish another data radio bearer for a different data service.

Attendant to the request for establishment of a data radio bearer, the data service control module 220 can be configured to format a message including information related to the data service for which a data radio bearer is to be established, and the wireless communication device 102 can send the formatted message to the wireless network. The bearer control module 318 of the RAN entity 106 can receive the information related to the data service as provided by the message from the wireless communication device 102, and can be configured to define an inactivity timeout period based at least in part on the information. The bearer control module 318 can be configured to establish a data radio bearer for the data service, with the data radio bearer having the defined inactivity timeout period, and can assign the data service to the data radio bearer. In this regard, the bearer control module 318 of some example embodiments can establish a data radio bearer having a customized inactivity timeout period uniquely defined for a particular data service and assign the data service to the data radio bearer. If an inactivity timeout period for a data radio bearer lapses due to inactivity on the data radio bearer, the bearer control module 318 can be configured to release the data radio bearer.

Figure 4:
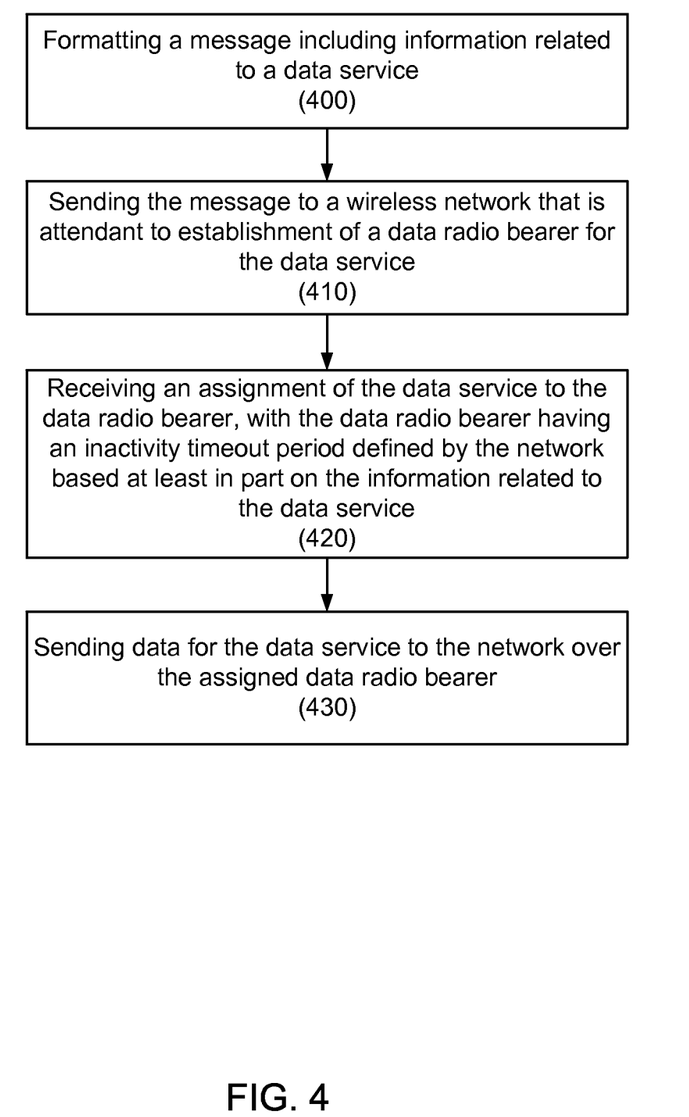
FIG. 4 illustrates a flowchart according to an example method for facilitating dynamic configuration of an inactivity timeout period for a data radio bearer according to some example embodiments.

FIG. 4 illustrates a flowchart according to an example method for facilitating dynamic configuration of an inactivity timeout period for a data radio bearer according to some example embodiments. In this regard, FIG. 4 illustrates operations that can be performed at a wireless communication device 102 in accordance with some example embodiments. One or more of the processing circuitry 210, processor 212, memory 214, wireless circuitry 216, or data service control module 220 can, for example, provide means for performing the operations illustrated in FIG. 4. Operation 400 can include formatting a message including information related to a data service. Several examples of information related to the data service that can be included in the message in accordance with various example embodiments are discussed further herein below. Operation 410 can include sending the message to the wireless network that is attendant to establishment of a data radio bearer for the data service. Operation 420 can include receiving an assignment of the data service to the data radio bearer. The data radio bearer can have an inactivity timeout period defined by the wireless network (e.g., by the RAN entity 106) based at least in part on the information related to the data service that can be sent in operation 410. Operation 430 can include sending data for the data service to the wireless network over the assigned data radio bearer.

Figure 5:
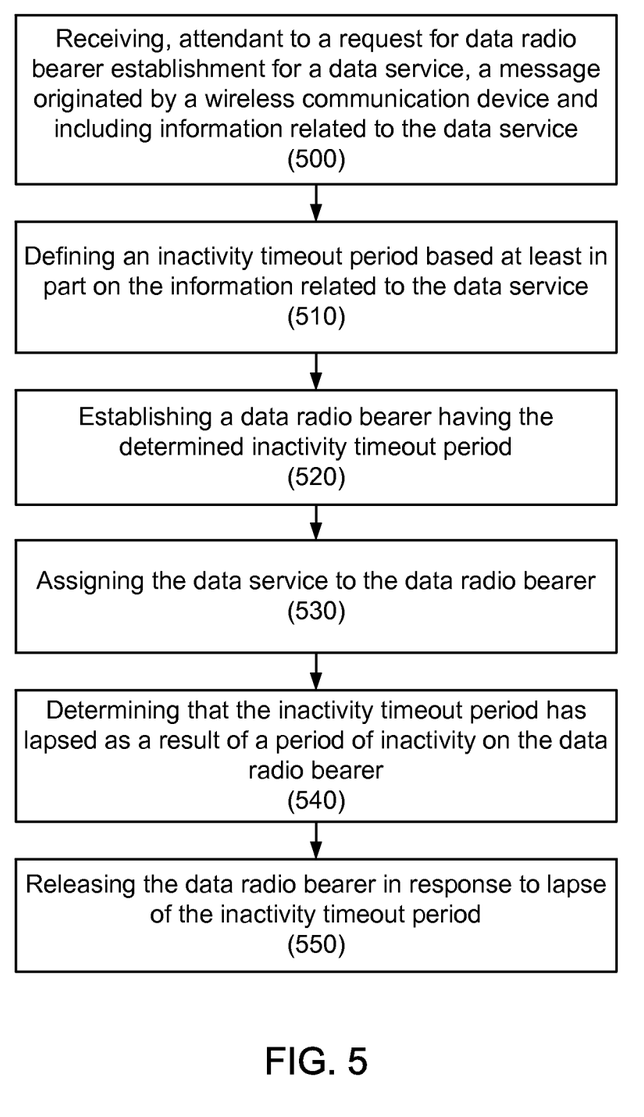
FIG. 5 illustrates a flowchart according to an example method for dynamically defining an inactivity timeout period for a data radio bearer according to some example embodiments.

FIG. 5 illustrates a flowchart according to an example method for dynamically defining an inactivity timeout period for a data radio bearer according to some example embodiments. In this regard, FIG. 5 illustrates operations that can be performed at the RAN entity 106 in accordance with some example embodiments. One or more of the processing circuitry 310, processor 312, memory 314, communication interface 316, or bearer control module 318 can, for example, provide means for performing the operations illustrated in FIG. 5. Operation 500 can include receiving, attendant to a request for data radio bearer establishment for a data service, a message originated by a wireless communication device 102 and including information related to the data service. Operation 510 can include defining an inactivity timeout period based at least in part on the information related to the data service. Several examples of information related to the data service that used to define the inactivity timeout period in accordance with various example embodiments are discussed further herein below. Operation 520 can include establishing a data radio bearer having the determined inactivity timeout period. Operation 530 can include assigning the data service to the data radio bearer.

The method of FIG. 5 can further include operations 540 and 550 in some instances. Operation 540 can include determining that the inactivity timeout period has lapsed as a result of a period of inactivity on the data radio bearer. Operation 550 can include releasing the data radio bearer in response to lapse of the inactivity timeout period. If only a single data radio bearer is active, operation 550 can further include releasing an RRC connection for the wireless communication device 102 so that the wireless communication device 102 can transition from the RRC connected mode to the RRC idle mode.

If multiple data services are active on the wireless communication device 102, a data radio bearer can be established for each data service, and each data radio bearer can have a uniquely defined inactivity timeout period. When the wireless communication device 102 has multiple established data radio bearers, the wireless communication device 102 can remain in a connected mode, e.g., the RRC connected mode, until all data radio bearers have been released. Thus, for example, in an instance in which the inactivity timeout period of each data radio bearer has lapsed and all data radio bearers have been released, the bearer control module 318 can release an RRC connection extant between the wireless communication device 102 and the wireless network, and the wireless communication device 102 can transition from the connected mode to the idle mode.

In some example embodiments, information related to the data service, which can be included in a message from the wireless communication device 102 sent to the wireless network, and which can be used to define the inactivity timeout period for a data radio bearer, can include an indication of a data service type of the data service. By way of non-limiting example, the data service type of a data service can be a message service data type, such as a short message service (SMS) message, multimedia messaging service (MMS) message, or other message service type; an email service; a web browsing data session; a voice data session; or other type of data service type which can be implemented on a wireless communication device 102 that can send and/or receive data over a wireless network. Thus, for example, a data radio bearer established for transmission of a first data service type can have a first inactivity timeout period, while a second data radio bearer established for a second data service type can a second inactivity timeout period. In some embodiments, the first and second inactivity timeout periods have different values, while in other embodiments, the first and second inactivity timeout periods have the same value. There can exist a mapping between an application that can be implemented on the wireless communication device 102 and a particular data radio bearer. In some such example embodiments, a data service type can be assigned to a data radio bearer such that a data radio bearer can be dedicated exclusively for servicing an assigned data service type. Accordingly, a data radio bearer established for SMS message transmission for which it may be less likely that there will be "near term" follow-up data transmission after a period of inactivity can have a shorter inactivity timeout period than a data radio bearer established for a web browsing session or other data service type for which it may be more likely that data transmission will resume after a relatively brief period of data inactivity. As such, by enabling the use of shorter inactivity timeout periods for some data service types, a data radio bearer can be released more quickly following a shorter period of inactivity than if a universal inactivity timeout period were used for all data service types.

Information related the data service that can be used to define the inactivity timeout period for a data radio bearer can additionally or alternatively include an amount of data to be sent for a data service in some example embodiments. For example, the data service control module 220 may know an estimated or an actual amount of data to be sent by the wireless communication device 102 for a data service and can signal this amount of data to the serving wireless network. Additionally or alternatively, the data service control module 220 may know an estimated or an actual amount of data to be downloaded or otherwise received by the wireless communication device 102 for the wireless network and can signal this amount to the serving wireless network. For example, a size of a file to be downloaded can be known in advance by the data service control module 220. The bearer control module 318 can accordingly be configured, in some example embodiments, to define an inactivity timeout period based at least in part on an actual or an estimated amount of data to be sent for a data service. For example, the length of the inactivity timeout period can be proportional to the amount of data to be sent for a data service. For example, if a first amount of data is to be transmitted in one instance and a second amount of data is to be transmitted in a second instance with the first amount of data being larger than the second amount of data, a longer inactivity timeout period can be defined in the first instance than in the second instance.

Additionally or alternatively, in some example embodiments, the information related to the data service that can be used to define the inactivity timeout period for a data radio bearer can include user history information indicative of a historical usage pattern for a user of the data service. In this regard, for example, the user history information can be indicative of whether a user of a data service continues to use the data service for an extended period of time that may encompass multiple interrupted segments of data transmission, or merely briefly uses a data service. By way of example, the user history information for web browsing can be used to distinguish between a user who historically opens a single web page and a user who engages in a prolonged web browsing session encompassing multiple page retrievals and periods of inactivity between page retrievals. In this regard, it may be appropriate to set a longer inactivity timeout period for a user who engages in a prolonged web browsing session so that a data radio bearer is not prematurely released between page retrievals. The data service control module 220 of such example embodiments can accordingly be configured to track usage patterns for one or more data services by a user(s) of the wireless communication device 102.

In some example embodiments, the information related to the data service that can be used to define the inactivity timeout period for a data radio bearer can additionally or alternatively include information about a usage state of the wireless communication device 102. For example, the information about the usage state can indicate whether the wireless communication device 102 is in a locked state. A locked state can be a state in which a display and/or other user interface component of the user interface 218 is locked or otherwise inactive. Thus, for example, if a touch screen display is locked or inactive, then the wireless communication device 102 can be defined as being in a locked state. When the wireless communication device 102 is in a locked state, an active data service active may be a background data service that may run without user input, as there may not be any active user input when the wireless communication device 102 is in a locked state. For a background data service or other data service that may be active in a locked state, there may be a lower likelihood of transmission of additional data following a period of inactivity than for a data service, such as web browsing, which may be used by a user in an unlocked state. Accordingly, in some example embodiments, a shorter inactivity timeout period can be defined in an instance in which the wireless communication device 102 is in a locked state than in an instance in which the wireless communication device 102 is in an unlocked state.

In some example embodiments, the bearer control module 318 can be configured to define an inactivity timeout period for a data radio bearer based at least in part on a modulation and coding scheme (MCS) used for a connection between the wireless communication device 102 and the wireless network and/or on one or more other radio frequency signal conditions of the connection. In this regard, the modulation and coding scheme and/or other radio frequency signal conditions can affect a realized data rate (e.g., a throughput). As such, the inactivity timeout period can be adjusted in some example embodiments to account for an effect of a particular modulation and coding scheme in use on the data rate of the connection over which the data radio bearer operates.

In some example embodiments, the data service control module 220 can be configured to request an extension and/or a reset of an inactivity timeout period in an instance in which it is known (or estimated to be likely) that additional data will be transmitted on a data radio bearer following a period of inactivity. In this regard, the data service control module 220 can control the wireless communication device 102 to send signaling to the wireless network to trigger a reset and/or an extension of the inactivity timeout period. The signaling can, for example, include sending a keep-alive packet over a data radio bearer. Additionally or alternatively, the signaling can include a dedicated signaling message or indication to request a reset or an extension of the inactivity timeout period. As still a further example, a media access control (MAC) layer, which can be implemented on the wireless communication device 102, can signal the wireless network that there is more data to be sent so that the data radio bearer is not released, including in an instance when there is not presently actual additional data queued to be sent (e.g., to retain the data radio bearer for future data transmission and/or reception by the wireless communication device 102). The bearer control module 318 can be configured to reset and/or extend the inactivity timeout period for a data radio bearer in response to such signaling received from the wireless communication device 102.

Figure 6:
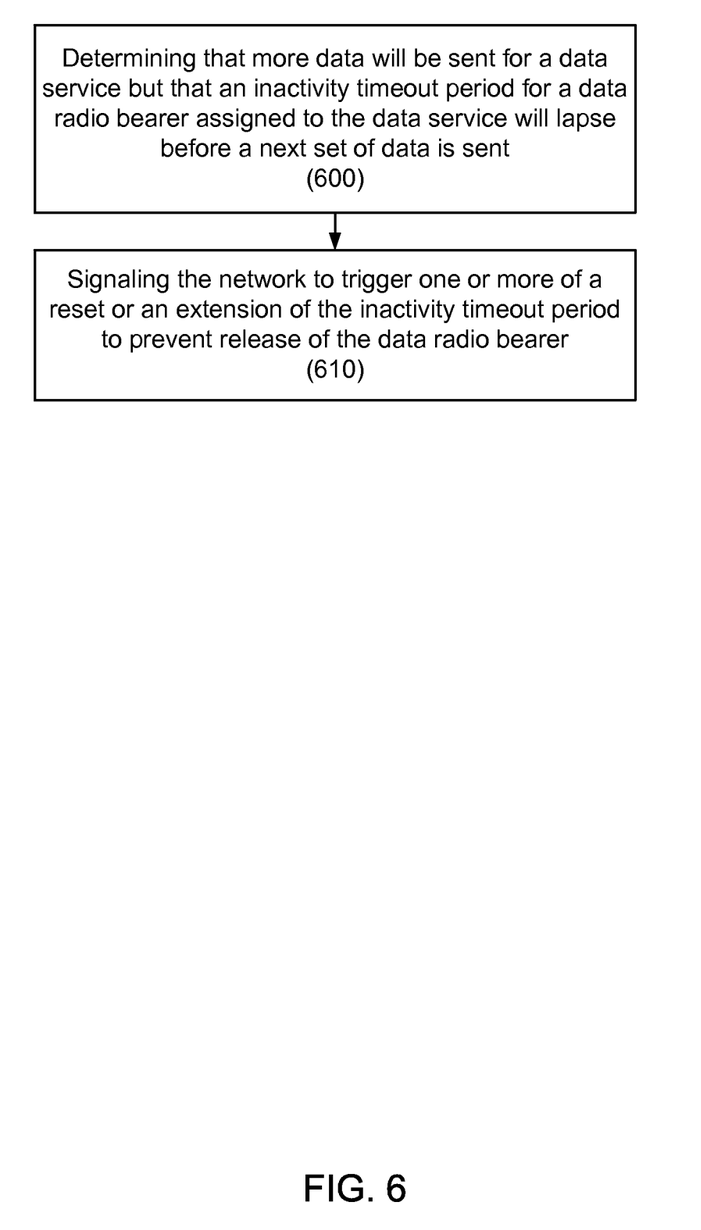
FIG. 6 illustrates a flowchart according to an example method for triggering a reset of an inactivity timeout period according to some example embodiments.

FIG. 6 illustrates a flowchart according to an example method for triggering a reset of an inactivity timeout period according to some example embodiments. In this regard, FIG. 6 illustrates operations that can be performed at a wireless communication device 102 in accordance with some example embodiments. One or more of the processing circuitry 210, processor 212, memory 214, wireless circuitry 216, or data service control module 220 can, for example, provide means for performing the operations illustrated in FIG. 6. Operation 600 can include determining that more data will be sent for a data service but that an inactivity timeout period for a data radio bearer assigned to the data service will lapse before a next set of data (e.g., one or more data packet(s)) is sent. In this regard, it may be known that more data will be sent, but the data may not yet be ready to be sent, e.g., formatting of the data may be "in process" while the buffer or other data storage used to determine information in a buffer status report may not yet include the data. Operation 610 can include signaling the wireless network in response to the determination of operation 600 so as to trigger one or more of a reset or an extension of the inactivity timeout period to prevent release of the data radio bearer.

In some embodiments, the wireless communication device 102 provides to the wireless network information in a message when establishing an RRC connection in advance of assigning a radio bearer. In some embodiments, the wireless communication device 102 communicates an RRC connection request message with an "establishment cause" that includes information about a data service to be used for the connection. In some embodiments, the "establishment cause" includes one or more of mobile originated data, mobile terminated access, a short message service (SMS) connection, a multimedia messaging service (MMS) connection, an Internet web browsing session, or a data packetized voice (e.g., VoLTE) session. In some embodiments the information of the "establishment cause" is sent separately from and/or in addition to information provided to the wireless network when requesting a data radio bearer and/or a specific data service. In some embodiments, a message from the wireless communication device 102 to the wireless network to establish a connection and/or to establish one or more radio bearers over which to communicate data for a particular data service and/or for a particular application resident on the wireless communication device 102 includes an actual or estimated amount of data to be sent and/or received, an actual or estimated length of time for data to be sent and/or received, a particular data server endpoint to which data may be sent and/or received (e.g., a specific access point name (APN) for a connection).

Representative applications of systems, methods, apparatuses, and computer program products according to the present disclosure are described herein. These examples are being provided solely to add context and aid in the understanding of the described embodiments. It will thus be apparent to one skilled in the art that the described embodiments may be practiced without some or all of these specific details. In some instances, well known process steps have not been described in detail in order to avoid unnecessarily obscuring the described embodiments. Other applications are possible, such that the examples provided herein should not be taken as limiting.

In the detailed description provided hereinabove, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium for controlling a wireless communication device and/or a wireless network entity. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method to establish a data radio bearer with a customized inactivity timeout period between a wireless communication device and a wireless network, the method comprising:
   formatting, by a processor of the wireless communication device, a message including information related to a data service;
   sending the message from the wireless communication device to the wireless network that is attendant to establishing one or more data radio bearers for the data service;
   receiving, at the wireless communication device, an assignment of the data service to the data radio bearer, the data radio bearer being associated with the customized inactivity timeout period defined by the wireless network based at least in part on the information related to the data service provided by the wireless communication device; and
   sending data for the data service from the wireless communication device to the wireless network via the data radio bearer,
   wherein the customized inactivity timeout period determines a continuous time period of data inactivity in both downlink and uplink directions for the data radio bearer for the data service while the data radio bearer is established and the wireless communication device operates in a radio resource control (RRC) connected state with the wireless network.

2. The method of claim 1, wherein the customized inactivity timeout period determines the continuous time period of inactivity in both the downlink and uplink directions for the data radio bearer after which the wireless network releases the data radio bearer.

3. The method of claim 1, wherein the information related to the data service comprises an indication of a data service type of the data service, and wherein the data radio bearer is dedicated exclusively for servicing the indicated data service type.

4. The method of claim 3, wherein the data service type comprises one of a short message service (SMS) message, a multimedia messaging service (MMS) message, an email, web browsing data, or voice data.

5. The method of claim 1, wherein the information related to the data service comprises an actual or an estimated amount of data to be sent for the data service over the data radio bearer.

6. The method of claim 1, wherein the information related to the data service comprises user history information indicative of a historical usage pattern for a user of the data service.

7. The method of claim 1, wherein the information related to the data service comprises device status information indicative of whether the wireless communication device is in a locked state.

8. The method of claim 1, wherein the customized inactivity timeout period is defined by the wireless network further based on a modulation and coding scheme used for a connection between the wireless communication device and the wireless network.

9. The method of claim 1, further comprising:
   signaling the wireless network to trigger one or more of a reset to restart the customized inactivity timeout period or an extension of time for the customized inactivity timeout period associated with the data radio bearer to allow for additional data activity for the data service over the data radio bearer.

10. The method of claim 1, further comprising:
    sending data for a second data service from the wireless communication device to the wireless network over a second data radio bearer, wherein the second data radio bearer has a second inactivity timeout period.

11. A wireless communication device comprising:
    a transceiver configured to transmit data to and receive data from a wireless network; and
    processing circuitry coupled to the transceiver, the processing circuitry configured to control the wireless communication device to at least:
       format a message including information related to a data service;
       send the message to the wireless network that is attendant to establishment of a data radio bearer for the data service;
       receive an assignment of the data service to the data radio bearer, the data radio bearer having an inactivity timeout period defined by the wireless network based at least in part on the information related to the data service; and
       send data for the data service to the wireless network over the data radio bearer, wherein the inactivity timeout period determines a continuous time period of data inactivity in both downlink and uplink directions for the data radio bearer for the data service while the data radio bearer is established and the wireless communication device operates in a radio resource control (RRC) connected state with the wireless network.

12. The wireless communication device of claim 11, wherein the data radio bearer is released by the wireless network in an instance in which the inactivity timeout period lapses due to data inactivity in both the downlink and uplink directions on the data radio bearer.

13. The wireless communication device of claim 11, wherein the information related to the data service comprises an indication of a data service type of the data service, and wherein the data radio bearer is dedicated exclusively for servicing the indicated data service type.

14. The wireless communication device of claim 11, wherein the information related to the data service comprises an actual or an estimated amount of data to be sent for the data service over the data radio bearer.

15. The wireless communication device of claim 11, wherein the information related to the data service comprises an actual or an estimated length of time for data to be sent or received for the data service.

16. The wireless communication device of claim 11, wherein the information related to the data service comprises an access point name (APN) to which data is to be sent and/or from which data is to be received.

17. A non-transitory computer-readable storage medium having storing computer program code that, when executed by one or more processors of a wireless communication device, causes the wireless communication device to at least:
format a message including information related to a data service;
send the message from the wireless communication device to a wireless network that is attendant to establishment of a data radio bearer for the data service;
receive, at the wireless communication device, an assignment of the data service to the data radio bearer, the data radio bearer having an inactivity timeout period defined by the wireless network based at least in part on the information related to the data service; and
send data for the data service from the wireless communication device to the wireless network over the data radio bearer,
wherein the inactivity timeout period determines a continuous time period of data inactivity in both downlink and uplink directions for the data radio bearer for the data service while the data radio bearer is established and the wireless communication device operates in a radio resource control (RRC) connected state with the wireless network.

18. The non-transitory computer-readable storage medium of claim 17, wherein the information related to the data service comprises an indication of a data service type of the data service, and wherein the data radio bearer is dedicated exclusively for servicing the indicated data service type.

19. The non-transitory computer-readable storage medium of claim 17, wherein the information related to the data service comprises an amount of data to be sent for the data service over the data radio bearer.

20. The non-transitory computer-readable storage medium of claim 17, wherein the information related to the data service comprises device status information indicative of whether the wireless communication device is in a locked state.

* * * * *